Sept. 1, 1942.  H. T. KRAFT  2,294,621
MOLDER
Filed Aug. 7, 1937  3 Sheets-Sheet 1

INVENTOR
*Herman T. Kraft*
BY
Evans + McCoy
ATTORNEYS

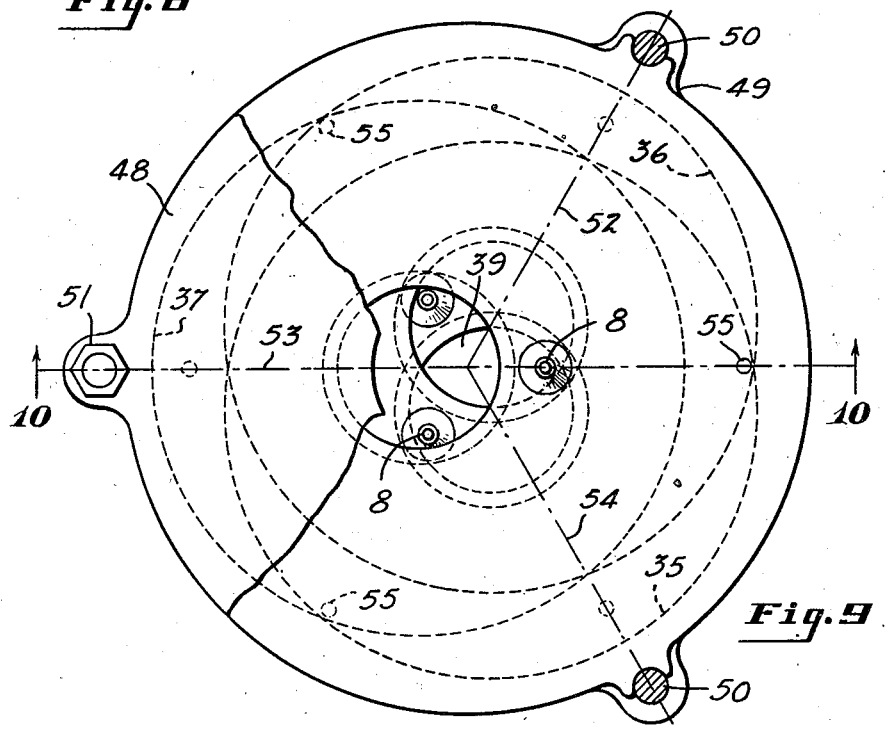

Sept. 1, 1942. H. T. KRAFT 2,294,621
MOLDER
Filed Aug. 7, 1937 3 Sheets-Sheet 3

INVENTOR
*Herman T. Kraft*
BY
*Evans + McCoy*
ATTORNEYS

Patented Sept. 1, 1942

2,294,621

UNITED STATES PATENT OFFICE 2,294,621

MOLDER

Herman T. Kraft, Akron, Ohio, assignor to The General Tire & Rubber Company, Akron, Ohio, a corporation of Ohio Application August 7, 1937, Serial No. 157,906

6 Claims. (Cl. 18—35)

It is an object of the present invention to provide an improved apparatus for manufacturing hollow molded articles of rubber without the use of internal mandrels or forms and which is simple and inexpensive.

Another object is to provide an apparatus for hollow article manufacture which is adapted for the use of pressure within the article during the molding or vulcanizing operation and a minimum of the pressure transmitting fluid is received within the article.

A more specific object is to provide an apparatus for inner tube manufacture which facilitates the production of inner tubes having variable wall thicknesses.

Other objects and advantages will become apparent as the description proceeds, which is made in connection with the accompanying drawings, in which:

Fig. 7 is a radial sectional view, with parts broken away, showing a modified form of inner tube constructed in accordance with the present invention;

Fig. 8 is a fragmentary radial view, in section, diagrammatically showing in their relative expanded positions the materials used in manufacturing the inner tube illustrated in Fig. 7;

Fig. 9 is a plan view partially in section and with parts broken away of a mold assembly employed in carrying out the present invention;

Fig. 10 is a sectional view of the mold assembly illustrated in Fig. 9 taken substantially on the line 10—10 of Fig. 9;

Figure 4:
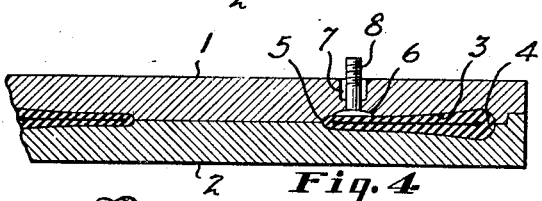
Fig. 4 is a fragmentary sectional detail view of the mold taken substantially on the line 4—4 of Fig. 2.

The present invention comprehends a pair of mold sections 1 and 2, preferably constructed of a suitable durable material such as cast iron or steel. They are arranged to be readily inserted in a heated press for the vulcanizing or molding operation. The meeting faces of the mold section are formed to cooperatively define a mold cavity 3. This cavity is in the form of an enclosed circular space or annulus, which corresponds with the desired external shape of the molded article to be manufactured, such, for example, as an inner tube. As shown in Fig. 4, outer marginal portion 4 of the cavity is of greater depth or thickness than inner marginal portion 5. A depression 6 is formed adjacent the inner margin of the cavity and is centrally provided with an aperture or hole 7 extending through the mold section 1. The hole 7 receives a valve stem 8 and the depressed portion 6 accommodates base 9 of the valve stem which is applied to the inner tube and is secured thereto during vulcanization.

To mold an inner tube, the mold sections 1 and 2 are separated and a valve stem inserted into the hole 7, with the valve stem base 9 in the depression 6 and substantially flush with the surface of the mold cavity 3.

Previously formed rings of raw rubber compound designated by the numerals 10, 11 and 12 are then placed on top of one another in the mold section 1. These rings are of different widths: the bottom ring 10 extends entirely across the width of the mold cavity, from the outer marginal portion 4 to the inner marginal portion 5; the second or intermediate ring 11 extends from the outer marginal portion 4 of the cavity across substantially one-half the width of the cavity, thus covering about one-half of the bottom or first ring 10 and leaving the inner or marginal one-half thereof uncovered; the third and smallest ring 12 extends from the outer marginal portion 4 about one-fourth the distance across the width of the cavity, thus covering about one-half of the surface of the middle ring 11. Accordingly, with the three rings 10, 11 and 12 positioned in the lower mold section 1, a composite raw rubber ring increasing in thickness from the inner marginal portion 5 to the outer marginal portion 4 is provided.

A suitable nonadhesive material is then applied to the middle portion of the composite exposed parts of the rubber rings. It has been found that a sheet of heat resistant paper in the form of an annular ring or separator 14 is satisfactory as an adhesion-preventing agent. Desirably, this paper separator 14 is provided with rolled edges 15 to minimize incipient cracks in the molding operation. This may be accomplished by folding marginal edges of the paper over a circumferentially extending cord 16.

On the opposite side of the paper separator 14 from the rings 10, 11 and 12 are placed the rings 20, 21 and 22 which are formed of raw rubber sheet material and preferably correspond in width, diameter and thickness to the rings 10, 11 and 12 respectively. Accordingly, the assembly of the raw rubber rings on opposite sides of the paper separator 14 is matched and provides a cross-section of rubber increasing in thickness from the inner marginal portions 5 to the outer marginal portion 4 of the mold cavity 3.

The radial width of the adhesion preventing separator 14 is less than the radial width of the mold cavity 3 and the rings 10 and 20. In addition, the paper ring is of such size that when positioned between the group of rings 10, 11 and 12 and the group of rings 20, 21 and 22, a continuous circumferential portion 25 of the ring 10 adjacent the inner marginal portion 5 of the mold cavity 3 is exposed and comes into adhering contact with a similar continuous circumferential portion 26 of the upper ring 20. Likewise, a continuous circumferential portion 27 of the lower ring 12 adjacent the outer marginal portion 4 of the mold cavity comes into adhering engagement with a like continuous circumferential portion 28 of the upper ring 22. Accordingly, in molding or vulcanizing process during which the several rubber rings are compressed together and formed into a unitary structure, the lower rings 10, 11 and 12 are vulcanized together and marginally bonded to the upper rings 20, 21 and 22.

After closing the assembled groups of rubber rings and separator within the mold cavity 3 pressure and heat are applied in accordance with established molding practice. The mold sections are then separated one from another, and the rubber stripped therefrom. During this molding operation the base 9 of the valve stem 8 becomes securely bonded to the rubber of the tube. By inserting a suitable implement through the aperture in the valve stem a hole may be made through the rubber communicating with the interior of the tube and permitting inflation thereof so that it may be used in pneumatic tires.

Figure 1:
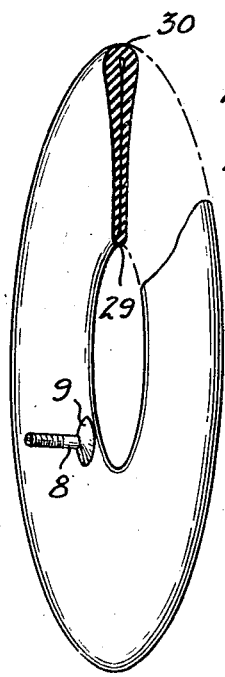
Figure 1 is a perspective view of an inner tube manufactured in accordance with the present invention, partly in section and with parts removed.
Figure 3:
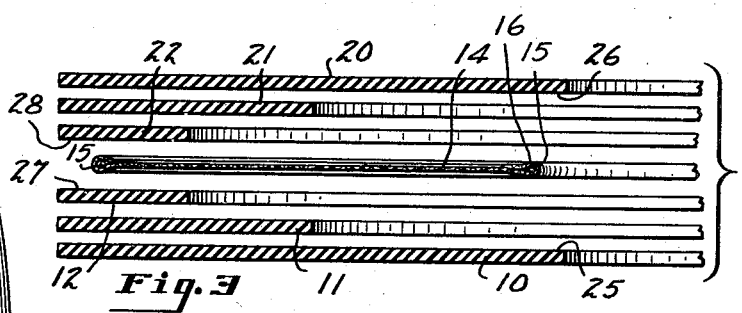
Fig. 3 is a fragmentary diagrammatic expanded view in section showing the materials which are placed in the mold cavity.
Figure 2:
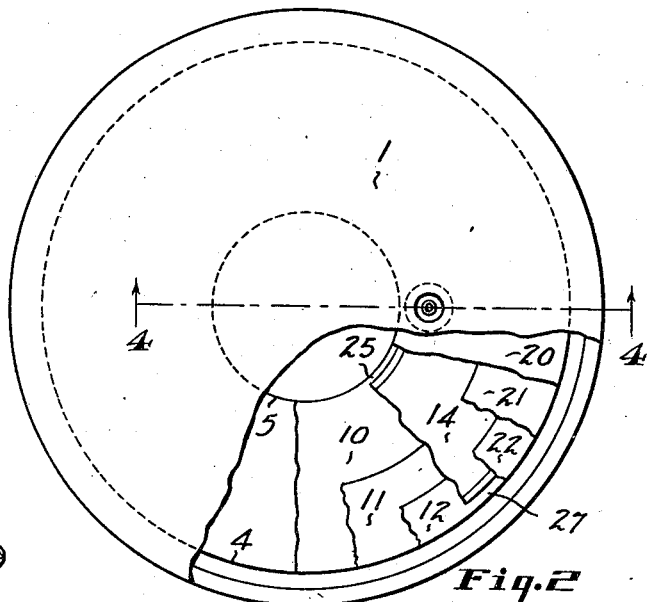
Fig. 2 is a plan view, with parts removed, showing a pair of mold members for carrying out the invention and the material out of which an inner tube is to be made positioned in the mold cavity.
Figure 6:
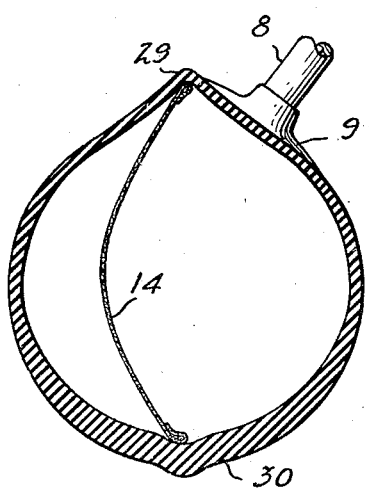
Fig. 6 is a radial detail sectional view showing the inner tube of Fig. 5 inflated.
Figure 5:
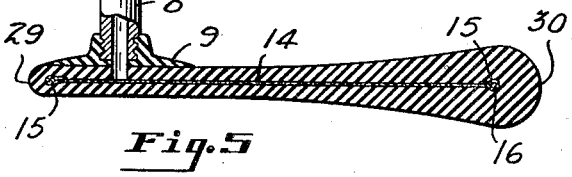
Fig. 5 is a radial detail sectional view of an inner tube constructed in accordance with the present invention.

Referring to Fig. 5, which shows a cross-section through an inner tube constructed according to the present invention, it is seen that the walls of the inner tube are of the usual thickness adjacent the inner portion 29 of the tube, normally positioned adjacent the rim of a wheel, while the walls increase in thickness and portion 30 of the inner tube normally positioned adjacent the tread of the tire is of maximum thickness. Thus, that portion of the inner tube subjected to the most severe use and wear is of increased thickness and affords an efficient and serviceable construction. Upon inflation, the inner tube assumes substantially the cross-sectional configuration illustrated in Fig. 6. The thickest portion of the inner tube, normally positioned in underlying relation with respect to the tread of a tire, has its outer surface of the portion 30 under compression, while the internal surface of the inner tube at the thickest portion thereof is under tension. This feature is of particular advantage since the compression of the outer surface of the inner tube tends to close up small holes and punctures which may occur in this thickened portion of the inner tube. Accordingly, the tube is substantially self-sealing and enables continued use thereof even after being punctured, so that maximum service and efficiency may be realized.

Fig. 7 is a radial sectional view of another tube constructed in accordance with this invention. This inner tube has a substantially uniform wall thickness and accordingly may be conveniently formed in a molding opertion from a pair of substantially identical raw rubber blanks 31 and 32. These blanks are ring-shaped, having outer diameters substantially equal to that of the desired finished inner tube and inner diameters substantially equal to that of the tube to be formed. Interposed between the blank rings 31 and 32 is a separator or anti-adhesion member 33 similar to the separator 14 previously described and which may be satisfactorily formed from heat resistant paper.

Inner tubes of the character illustrated in Fig. 7 may be manufactured in quantity by use of a mold such as that illustrated in Figs. 9 and 10. This mold has a multiplicity of pairs of mold sections placed in side by side relation with respect to one another, preferably one on top of another, and the entire group clamped together and simultaneously heated in a single molding or vulcanizing operation. In the present instance the mold comprises four pairs of mold sections. Each pair defines a molding or vulcanizing cavity in which an inner tube may be formed and which is arranged in substantially parallel relation with every other like cavity. These cavities are indicated by the numerals 34, 35, 36 and 37, mold cavity 34 being formed by mold sections 40 and 41, cavity 35 by mold sections 42 and 43, cavity 36 by sections 44 and 45, and cavity 37 by sections 46 and 47.

The mold sections are of substantially greater diameter than the extreme diameter of the article or inner tube to be formed therein and the mold cavity is materially offset or formed eccentrically with respect to the periphery of the mold section, so that it is off center. As used to define the invention, the words "eccentric" and "offset" are to be understood to mean a deliberate or intentional positioning of the mold cavities as distinguished from that resulting from inaccurate machining or poor workmanship. The central portions of the mold sections in which no cavity is formed are apertured at 39 for a purpose to be hereinafter described. To hold the several mold sections together during molding or vulcanization the mold parts 48 and 49 are placed on opposite sides of the several pairs of mold sections and threaded tie rods 50 are secured in the mold part 49. These rods extend through apertures in the mold part 48 and receive nuts 51 which serve to draw the mold parts 48 and 49 together, securely clamping the several mold sections therebetween with the edges of the molds in juxtaposition and with the cavities offset or staggered with respect to one another.

To manufacture inner tubes in accordance with this method the raw rubber blanks 31 and 32 which, as previously mentioned, are substantially identical, are preferably formed in quantities and assembled with the paper separators 33 into raw rubber inner tubes or mold cavity fillers. This may be satisfactorily done in another room or department from that in which the molding operation itself is performed, so that the method lends itself to economical commercial manufacturing methods. The mold cavity fillers may then be supplied to the molding department as required.

To prepare the mold for the vulcanizing operation, a mold cavity blank comprising the raw rubber blanks 31 and 32 enclosing a separator 33, and if desired having fixed thereto a valve stem 8, is placed within each of the mold cavities 34, 35, 36 and 37 between the respective mold sections. Each of the mold sections 40, 42 and 46 is provided with an aperture to receive the valve stem of the inner tube being formed in that particular mold cavity. These apertures are positioned in that portion of their respective mold section which is nearest the center of the mold. As previously mentioned, each mold cavity is offset or eccentric with respect to the outer marginal portion or edge of the mold section. Accordingly, by staggering the relative positions of the successive mold cavities each valve stem can be arranged to extend upwardly into apertures 39 of the next succeeding pairs of mold sections. In the present instance each mold cavity is staggered approximately 120° with respect to each preceding and each succeeding cavity while the edges of adjacent molds are juxtaposed. For example, mold parts 46 and 47 are positioned so that mold cavity 37 is at the extreme left as viewed in Fig. 9. Mold sections 44 and 45 are positioned so that mold cavity 36 has its axis of eccentricity, indicated by the numeral 52, substantially 120° in a clockwise position from the axis of eccentricity 53 of mold cavity 37. The mold parts 40 and 41 are positioned in analogous position to the mold parts 46 and 47 so that the mold cavity 34 is in an analogous position to the mold cavity 37 and has its axis of eccentricity in the same plane as the axis of eccentricity 53. In the event that it were desired to include additional mold sections so that a larger number of inner tubes could be fabricated in a single vulcanizing operation, the added mold sections would be positioned with their axes of eccentricity positioned at progressive 120° angles with one another and with their edges juxtaposed. The mold sections of each pair are maintained in alinement by any suitable means, such as mold pins 55 secured in one mold section and arranged to be received in suitable apertures in the companion mold section.

Figure 11:
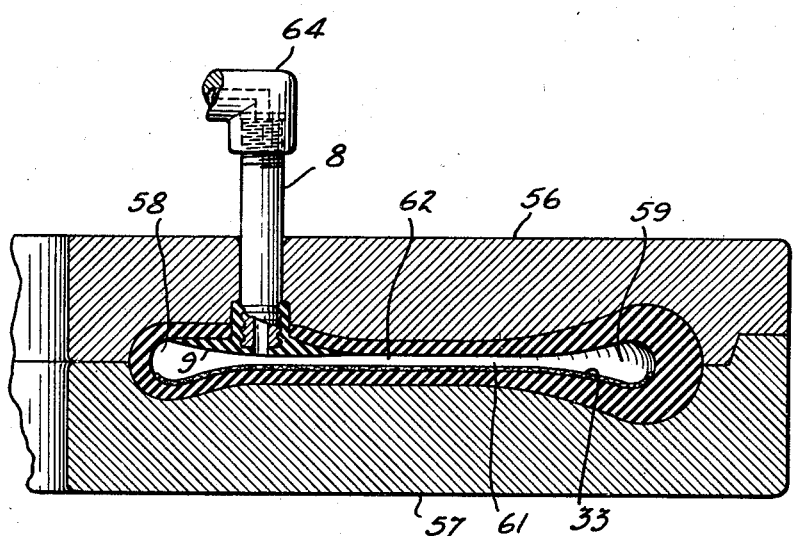
Fig. 11 is a radial view, in section, and similar to Fig. 4, showing a modified inner tube and method of vulcanizing the same.

Fig. 11 illustrates a method of manufacture in which pressure may be applied internally of the article during vulcanization. Mold sections 56 and 57 cooperatively define a vulcanizing cavity similarly to the manner in which mold sections 1 and 2 define mold cavity 3 previously described. This mold cavity, however, is of greater thickness than required to accommodate the rubber compound or material out of which the article, in this case an inner tube, is to be made. Preferably, the inner and outer marginal portions of the mold cavity are increased in thickness relatively more than the central portion of the mold cavity. Accordingly, upon the application of a fluid pressure to the interior of the article, as will be later described, there is an annular space 58 formed within the inner tube and extending around the inner marginal portion of the mold cavity. Similarly, there is an annular space 59 formed within the inner tube and extending around the outer marginal portion of the mold cavity. Each of the spaces 58 and 59 are continuous with the circumferential margins of the central annular space 62 extending around the mold cavity inside the inner tube and of relatively small thickness with respect to the spaces 58 and 59.

During the vulcanization process, fluid pressure in the spaces 58 and 59 forces the rubber compound against the mold sections 56 and 57 giving a rounded contour to both the inner and outer surfaces of the inner tube.

In assembling the rubber compound rings and separator 33 for carrying out the method illustrated in Fig. 11, the valve stem 8 may be first inserted through a suitable hole in one of the rubber rings so that the rubber base 9 of the valve stem is positioned in the internal cavity 61 of the inner tube against the separator 33. This construction permits a stronger bond between the rubber of the inner tube and the base 9 of the valve stem and the tendency of the valve stem to come loose from the inner tube is minimized.

During vulcanization, according to the method illustrated in Fig. 11, a pressure fitting 64 is applied to the protruding end of the valve stem 8 so that a suitable fluid under pressure may be applied to the interior of the inner tube.

Figure 12:
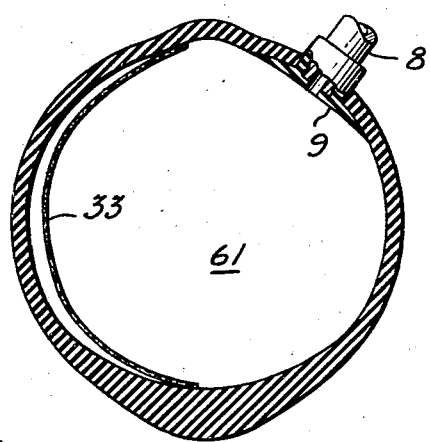
Fig. 12 is a sectional view of the inner tube of Fig. 11 inflated.

Upon inflation of an inner tube of the character made in accordance with the method shown in Fig. 11, it assumes substantially the contour illustrated in Fig. 12, the rounded inner surfaces of the inner tube afforded by the spaces 58 and 59 blend into the previously relatively flat surfaces in the side walls of the inner tube so that a sharply outlined ridge or crest extending angularly around the inner and outer margins of the inner tube is avoided.

As many pairs of mold sections may be assembled in a single mold unit as desired, the showing of four in Fig. 10 being merely to indicate the mode of operation of the method and the manner in which the succeeding pairs of mold sections are arranged in cyclic staggered relation with respect to one another.

In carrying out the method of manufacture illustrated in Figs. 1 through 6, the raw rubber rings 10, 11, and 12 and 20, 21, and 22 may be assembled with the separator 14 and also with the valve stem 8, independently of the mold in a manner similar to that described in connection with the inner tube illustrated in Figs. 7 and 8. The assembled rings of rubber together with their separator and valve stem constitute, in effect, a mold cavity filler; the several parts being held together by the inherent tackiness of the raw rubber thus permitting handling and movement of the filler from one department to another of a manufacturing establishment to another. This latter method speeds up the use of the mold sections and affords a maximum useful operating time therefor.

The apparatus of the present invention lends itself to commercial adaptation in quantity production of hollow molded articles of vulcanized material such as rubber. The assembled mold units of the character described above occupy a minimum of space and are of considerable economy in operation. Furthermore, molds of this character may be operated with or without the application of internal pressure to the articles being vulcanized. In those applications where it is desirable to use an internal pressure during the vulcanizing operation the quantity of fluid admitted into the interior of the article during vulcanization is minimized. This feature is of particular value where the pressure fluid is air, which may have a deleterious effect in the nature of oxidation on the raw rubber during vulcanization. The quantity of pressure fluid admitted into the interior of the articles being molded is minimized by the fact that the cavity 61 in which the separator 33 is positioned may be of very little thickness; yet its effectiveness for receiving a fluid to apply an internal pressure to the article during a vulcanizing or molding operation is not impaired, since the fluid pressure is as effective when applied throughout a chamber of small volumetric capacity as applied throughout a chamber of large volumetric capacity.

Accordingly, the present invention provides a novel apparatus for the manufacture of hollow molded rubber articles such as inner tubes for vehicle tires which is advantageous in that there is a complete absence of seams or joints extending around the body of the inner tube affording a uniform and homogeneous structure. Furthermore, the vulcanizing or molding operation may be carried out if desired without the use of internal air pressure and an inner tube may be produced with advantageous puncture-sealing properties which render it of considerable importance and value in commercial applications.

The apparatus for manufacturing hollow molded articles described above and illustrated in the drawings is given for purposes of illustration and description only, and various modifications and alterations thereof are contemplated and intended to be included within the scope of the appended claims.

I claim:

1. Molding apparatus comprising in combination a plurality of pairs of substantially circular mold sections, the sections of each pair having end surfaces and being formed to cooperatively define an annular molding cavity, an aperture extending through each pair of sections and eccentrically disposed relative to the peripheries thereof, said apertures being surrounded by the cavities, a passage through one section of each pair, said passages being in communication with the cavities and opening through the end surfaces of the sections, said pairs of sections being disposed in end to end relation with each passage opening into the aperture of the next adjacent pairs of sections, and means for clamping the pairs of sections together with their peripheral edges substantially in alignment with one another.

2. A thin mold for use in cooperative assembled association with other molds of like character comprising a pair of relatively broad thin members having confronting faces formed to define a single annular cavity and having outside facts for engagement with the like faces of the other molds, an aperture through the mold members and concentric with the cavity, said cavity being materially offset toward a marginal edge of the mold whereby a plurality of such molds can be assembled in face to face relation with their cavities materially offset from one another and with their edges juxtaposed, and a passage from said cavity extending through one of the members and opening through the outside face of the latter for receiving an inflating stem attached to an article in the cavity.

3. A thin mold for use in cooperative assembled association with other molds of like character comprising a pair of relatively broad thin members having confronting faces formed to define a single annular cavity and having outside faces for engagement with the like faces of the other molds, an aperture through the mold members and concentric with the cavity, said cavity being materially offset toward a marginal edge of the mold so that one portion of the cavity is relatively remote from the mold edge whereby a plurality of such molds can be assembled in face to face relation with their cavities materially offset from one another and with their edges juxtaposed, and a passage from said remote cavity portion extending through one of the members and opening through the outside face of the latter for receiving an inflating stem attached to an article in the cavity.

4. A thin mold for curing a hollow rubber annulus in flattened form comprising a pair of relatively broad thin mold members having confronting faces formed to define a single annular cavity with relatively thin circular inner and outer marginal portions, said cavity being flattened in the plane of said faces so that the parting lines of said mold faces are disposed along the thin margins of the cavity, said mold members having outside faces for engagement with pressure applying means, and a passage through one of the mold members from a point in the cavity adjacent one of the thin margins and spaced from the parting lines to an opening through the outside face of said one mold member for receiving an inflating stem attached to a flattened annulus in the cavity whereby such stem can be attached to a flattened portion of the annulus removed from the parting lines of the mold.

5. Vulcanizing apparatus comprising a plurality of pairs of relatively broad thin mold members, each pair having an aperture therethrough eccentric to the main body of the apparatus and having meeting faces formed to cooperatively define a single flattened annular cavity extending around the aperture and concentric thereto, and each pair having outside faces for engagement with like faces of other pairs, a passage extending through one member of each pair from the cavity to an opening through the outside face of said one member for receiving an inflating stem attached to a flattened annulus in the cavity, and means for clamping the pairs of mold members together in assembled relation with their outside faces in bearing relation and with the several cavities in staggered relation so that the stems extend into the apertures of the adjacent pairs of mold members.

6. Apparatus for vulcanizing hollow rubber articles having tubular inflating stems comprising a series of pairs of separable mold sections stacked one above another, the sections of each pair having generally horizontal meeting faces formed to cooperatively define a cavity for one of the articles, a passage extending through the uppermost section of each pair to receive the inflating stem of an article disposed in the cavity of such pair, and each pair of sections being so formed and arranged as to receive the end of the inflating stem projecting upwardly from the passage of a lower pair of sections.

HERMAN T. KRAFT.